(12) United States Patent
King et al.

(10) Patent No.: US 6,873,139 B2
(45) Date of Patent: Mar. 29, 2005

(54) OFF-LINE SWITCHING POWER SUPPLY FOR GENERATING NEGATIVE VOLTAGES

(75) Inventors: Jonathan D. King, Lexington, TN (US); Tommy D. Hollingsworth, Leander, TX (US)

(73) Assignee: Maytag Corporation, Newton, IA (US)

( * ) Notice: Subject to any disclaimer, the term of this patent is extended or adjusted under 35 U.S.C. 154(b) by 1 day.

(21) Appl. No.: 10/264,857

(22) Filed: Oct. 4, 2002

(65) Prior Publication Data

US 2004/0066660 A1 Apr. 8, 2004

(51) Int. Cl.$^7$ .................................................. G05F 1/40
(52) U.S. Cl. ...................................... 323/282; 323/266
(58) Field of Search ............................. 363/16, 17, 20, 363/21.12, 21.9, 19, 56, 97, 21.02, 21.04; 323/222, 225, 271, 272, 266, 267, 282, 284

(56) References Cited

U.S. PATENT DOCUMENTS

| | | | |
|---|---|---|---|
| 4,849,868 A | | 7/1989 | Fisher |
| 5,196,995 A | | 3/1993 | Gulczynski |
| 5,513,088 A | | 4/1996 | Williamson |
| 5,515,263 A | | 5/1996 | Otake et al. |
| 5,572,735 A | * | 11/1996 | Tanikawa ................... 713/300 |
| 5,581,451 A | | 12/1996 | Ochiai |
| 5,671,131 A | | 9/1997 | Brown |
| 5,736,841 A | * | 4/1998 | Gucyski ..................... 323/222 |
| 5,982,639 A | | 11/1999 | Balakirshnan |
| 6,087,817 A | * | 7/2000 | Varga ......................... 323/282 |
| 6,101,105 A | | 8/2000 | Gilmore |
| 6,134,123 A | | 10/2000 | Yamada |
| 6,150,803 A | * | 11/2000 | Varga ......................... 323/282 |
| 6,226,190 B1 | | 5/2001 | Balakrishnan et al. |
| 6,341,075 B2 | | 1/2002 | Yasumura |

* cited by examiner

*Primary Examiner*—Rajnikant B. Patel
(74) *Attorney, Agent, or Firm*—McKee, Voorhees & Sease, P.L.C.

(57) ABSTRACT

An off-line switching power supply for generating negative voltages without a transformer, comprising a line voltage connection for receiving a line voltage, an inductor having a first terminal and a second terminal, a power MOSFET having a drain and a source, the drain electrically connected to the first terminal of the inductor, the drain electrically connected to the first terminal of the inductor, the source electrically connected to the voltage and the second terminal of the inductor providing a negative output voltage.

14 Claims, 2 Drawing Sheets

OFF-LINE SWITCHING POWER SUPPLY FOR GENERATING NEGATIVE VOLTAGES

BACKGROUND OF THE INVENTION

This invention is an off-line switching power supply for generating negative voltages. More specifically, this invention is an off-line switching power supply for generating negative voltages so that a transformer is not required.

Switching power supplies are widely used in a number of applications. They are often preferred because they are very efficient in that there is very little power dissipation by a transistor switch that switches between being off and being saturated. Despite this and other advantages of switching power supplies, problems remain.

One problem is generating negative voltages such as for the control of triac driven AC loads. In order to generate negative voltages, a flyback transformer is used. The flyback transformer is used to provide for inverting of an input voltage. The addition of a flyback transformer adds substantial cost to the power supply. In addition, transformers can be large in size, thus require increased space and further increases in manufacturing costs. Further, the use of a transformer in product designs can introduce additional UL issues.

Therefore, it is a primary object of the present invention to provide an off-line switching power supply that improves over the state of the art.

It is a further object of the present invention to provide an off-line switching power supply capable of generating negative voltages.

Yet, another object of the present invention is to provide an off-line switching power supply that is low in cost to manufacture.

A further object of the present invention is to provide an off-line switching power supply that does not require use of a transformer to generate negative voltages.

A further object of the present invention is to provide an off-line switching power supply that uses voltage feedback to regulate an output voltage.

A still further object of the present invention is to provide an off-line switching power supply that is capable of producing multiple outputs with different negative voltages.

These and other objects, features or advantages of the present invention will become apparent from the specification and claims that follow.

SUMMARY OF THE INVENTION

The present invention is an off-line switching power supply for generating negative voltages. The present invention does not require use of a transformer to generate negative voltages. The present invention has a line voltage connection for receiving a line voltage, an inductor having a first terminal and second terminal, and a power MOSFET. The power MOSFET has a drain and a source. The drain is electrically connected to the first terminal of the inductor and the source is electrically connected to the line voltage connection. The second terminal of the inductor provides negative output voltage. This configuration of the power MOSFET thus allows negative voltages to be produced without using a transformer.

Another aspect of the invention is a feedback circuit that is used to help regulate the output voltage. The feedback circuit has an input electrically connected to the second terminal of the inductor and output operatively connected to a gate of the power MOSFET. The feedback circuit can include an optoisolator.

Another aspect of the present invention is that the off-line switching power supply can have multiple negative voltage outputs. A voltage regulator can regulate a first negative output voltage to a second negative output voltage.

Another aspect of the present invention is that the MOSFET can be a part of an off-line switcher integrated circuit. The off-line switcher can also include a control circuit in addition to the MOSFET.

Thus, according to the present invention, one or more negative output voltages are generated using the off-line switching power supply and without requiring the use of a transformer.

DETAILED DESCRIPTION OF THE INVENTION

Figure 1:
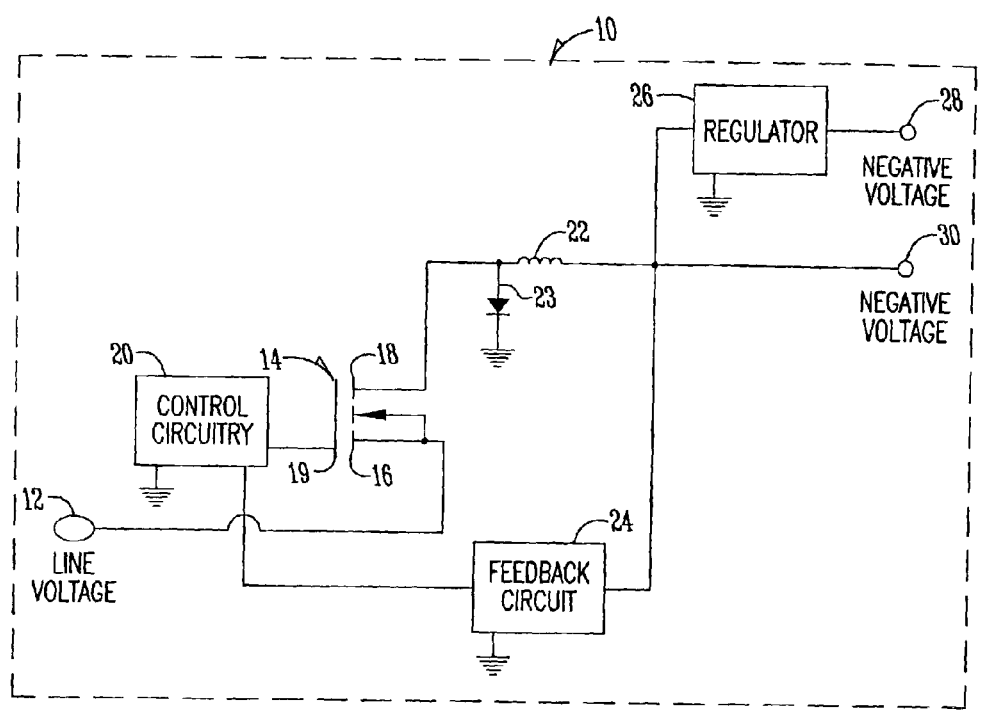
FIG. 1 is a block diagram schematic of the present invention.

The invention is an off-line switching power supply for generating negative voltages without use of a transformer. FIG. 1 illustrates one embodiment of the present invention. In FIG. 1, the off-line switching power supply 10 includes a line voltage input connection 12. Preferably, the voltage signal at connection 12 is a filtered and rectified AC voltage signal. The present invention, however, contemplates that the input line voltage can take other forms. The input line voltage connection 12 is electrically connected to a power MOSFET 14 at a source terminal 16. The power MOSFET 14 also has a drain terminal 18 and a gate terminal 19. The gate terminal 19 is electrically connected to control circuitry 20. The control circuitry 20 can provide for line undervoltage sense functions, over temperature protection, enable functions, and other control functions such as may be useful or desirable in a particular application.

The drain 18 of the power MOSFET 14 is also electrically connected to an inductor 22. The drain 18 is further connected to a diode 23 to provide for half wave rectification. The second terminal of the inductor 22 is electrically connected to a negative voltage output 30.

The connection of the drain 18 to the first terminal of the inductor 22 and the connection of the source 16 to the input line voltage connection 12 allows for a negative voltage output to be produced without requiring the use of a transformer.

The present invention also provides for a feedback circuit 24 and a regulator 26. The feedback circuit 24 is electrically connected to the second terminal of the inductor 22 as well as to the control circuitry 20. The feedback circuit 24 is used to provide voltage feedback in order to regulate the output voltage.

The regulator 26 is used to regulate down the produced negative voltage in order to provide a second negative voltage at terminal 28.

Figure 2:
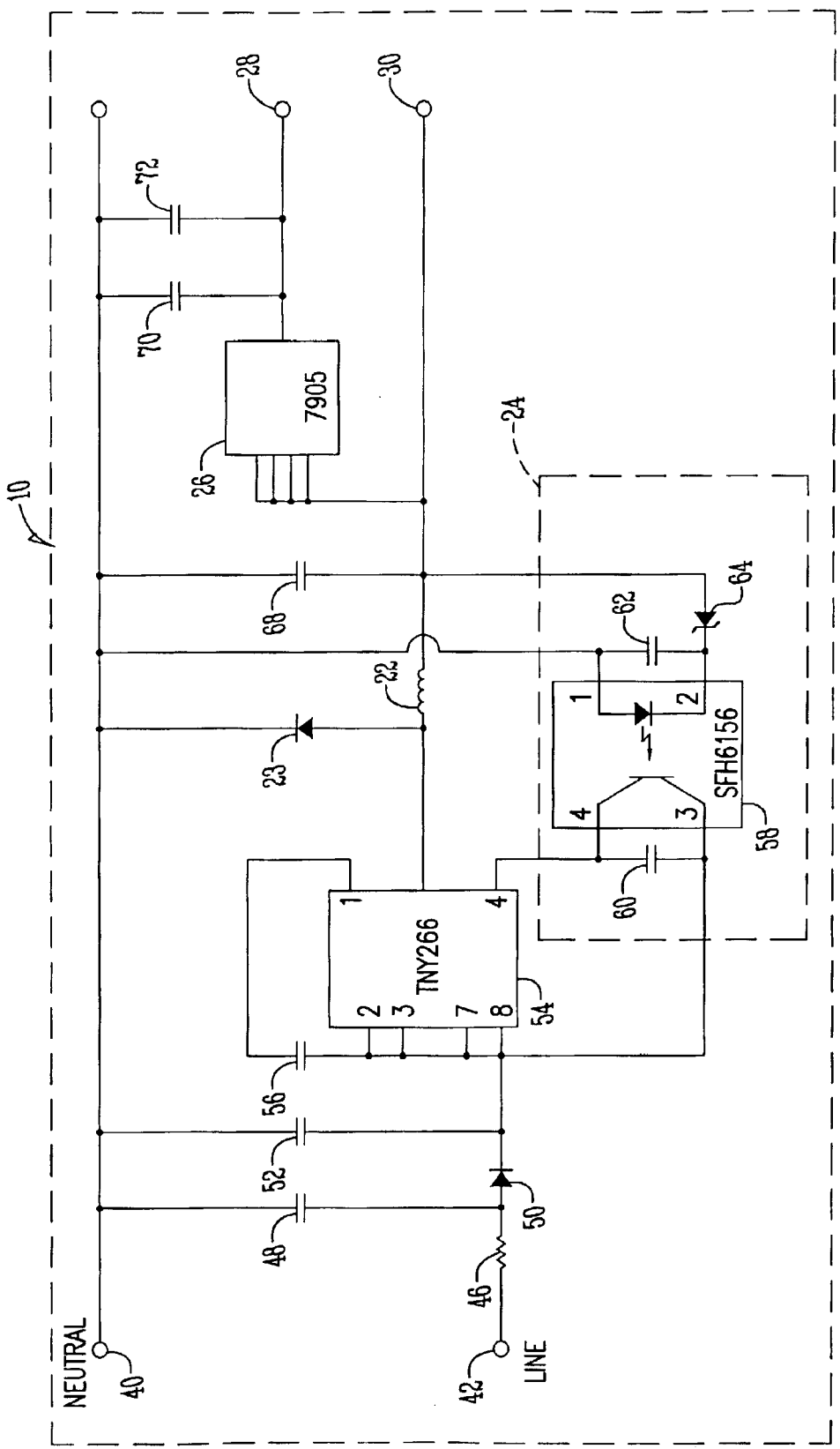
FIG. 2 is a detailed circuit schematic of one embodiment of the present invention.

FIG. 2 provides a detailed schematic of one embodiment of a power supply according to the present invention. FIG. 2 shows the power rails 40 and 42. The power across power rails 40 and 42 is unregulated and preferably filtered AC power. A resistor 46 acts as a current limiting resistor in order to limit the current into the remainder of the power supply circuit. A bypass capacitor 48 is shown across power rails 40 and 42 to reduce noise. In addition, a diode 50 is used to provide for half wave rectification. The capacitor 52 is used to reduce ripple or otherwise smooth the voltage wave form.

Also electrically connected to the diode 50 and the capacitor 52 is an off-line switcher integrated circuit 54. One example of such a circuit that can be used in the present invention is the TNY 266 available from Power Integrations, Inc. The power switcher 54 contains control circuitry 20 and the power MOSFET 14. Also shown is an external bypass capacitor 56 electrically connected to the power switcher 54. A flyback diode 23 is also electrically connected between the first terminal of the inductor and the neutral rail 40 to provide current continuity when the MOSFET 14 is switched to the off state. A capacitor 68 is placed between the second terminal of the inductor 22 and the neutral power rail 40 to provide for smoothing of the line voltage of output connection 30. The drain 18 of the power MOSFET 14 is electrically connected to the inductor 22 at the first terminal and the second terminal of the inductor 22 is electrically connected to a negative voltage output 30.

A feedback circuit 24 is shown that includes an optoisolator 58 such as a SFH 6156 available from Isocom, although any number of optically coupled isolators can be used. An optoisolator is used to isolate the negative voltage output from the line power. The present invention contemplates that other types of voltage feedback circuits can be used. However, an optoisolator circuit is preferred in order to isolate the output voltages from the input. One example of an alternative is use of a transformer to provide isolation (such a transformer would be smaller and less expensive than a transformer used in a prior art flyback converter).

A bypass capacitor 60 is shown across the outputs of the optoisolator 58. A bypass capacitor 62 is also shown across the inputs of the optoisolator 58. A zener diode 64 having a working voltage of approximately the same magnitude as the desired output voltage at connection 30 operates as a voltage reference between the inductor 22 and the optoisolator 58. Thus, deviations in the voltage output from the inductor 22 away from the desired output voltage, result in feedback that alters the voltage output from the inductor 22.

A voltage regulator 26 is also electrically connected to the second terminal of the inductor 22. The voltage regulator 26 steps down the output voltage in order to generate a second output voltage. A capacitor 70 is shown for smoothing the output voltage from the voltage regulator 26 and a bypass capacitor 72 is also used. For example, where the negative output voltage at connection 30 is −12 V, a 7905 regulator can be used to provide a −5 V output at connection 28. The negative output voltage can then be used to control a triac driven load.

Thus, an off-line switching power supply for generating negative voltages without a transformer has been disclosed. The present invention contemplates variations in the particular selection of components and configuration of particular components as may be appropriate within a particular application or to meet particular design objectives. These and other variations are within the spirit and scope of the invention.

What is claimed is:

1. An off-line switching power supply for generating negative voltages, comprising:
    a line voltage connection for receiving a line voltage;
    an inductor having a first terminal and a second terminal;
    a power MOSFET having a drain, a source and a gate, the drain electrically connected to the first terminal of the inductor, the source electrically connected to the line voltage;
    the second terminal of the inductor providing a negative output voltage;
    a feedback circuit with an input electrically connected to the second terminal of the inductor and an output operatively connected to the gate of the power MOSFET; and
    wherein the off-line switching power supply generates the negative voltages without any transformer, the inductor not being a part of any transformer.

2. The off-line switching power supply of claim 1 wherein the feedback circuit includes an optoisolator.

3. The off-line switching power supply of claim 1 wherein the negative output voltage is −12V.

4. The off-line switching power supply of claim 1 further comprising a voltage regulator electrically connected to the second terminal of the inductor for providing a second negative output voltage.

5. The off-line switching power supply of claim 4 wherein the second negative output voltage is −5V.

6. The off-line switching power supply of claim 1 further comprising a control circuit electrically connected to the power MOSFET.

7. The off-line switching power supply of claim 6 further comprising an integrated circuit that includes the control circuit and the power MOSFET.

8. The off-line switching power supply of claim 7 wherein the integrated circuit is an off-line switcher.

9. The off-line switching power supply of claim 1 wherein the line voltage is a rectified AC voltage signal.

10. An off-line switching power supply for generating negative voltages, comprising:
    an input line voltage connection for receiving an input line voltage;
    an off-line switcher having a power MOSFET with a gate, a drain, and a source, the source operatively connected to the input line voltage connection;
    an inductor having a first terminal and a second terminal, the first terminal of the inductor electrically connected to the drain of the MOSFET, the second terminal of the inductor providing a negative output voltage;
    a feedback circuit with an input electrically connected to the second terminal of the inductor and an output operatively connected to a gate of the power MOSFET of the off-line switcher; and
    wherein the off-line switching power supply generates the negative voltages without any transformer, the inductor not being a part of any transformer.

11. The off-line switching power supply of claim 10 further comprising a voltage regulator electrically connected to the second terminal of the inductor for providing a second negative output voltage.

12. The off-line switching power supply of claim 1 further comprising a diode having an anode and a cathode, the anode of the diode electrically connected to the first terminal of the inductor and the cathode of the diode electrically connected to ground.

13. The off-line switching power supply of claim 10 further comprising a diode having an anode and a cathode, the anode of the diode electrically connected to the first terminal of the inductor and the cathode of the diode electrically connected to ground.

14. An off-line witching power supply for generating negative voltages, comprising:
    an input line voltage connection for receiving an input line voltage;
    an off-line switcher having a power MOSFET with a gate, a drain, and a source, the source operatively connected to the input line voltage connection;
    an inductor having a first terminal and a second terminal, the first terminal of the inductor electrically connected to the drain of the MOSFET, the second terminal of the inductor providing a negative output voltage;

a feedback circuit with an input electrically connected to the second terminal of the inductor and an output operatively connected to a gate of the power MOSFET of the off-line switcher;

the feedback circuit comprising an optoisolator; and wherein the off-line switching power supply generates the negative voltages without any transformer, the inductor not being a part of any transformer.

* * * * *